(12) United States Patent
Li et al.

(10) Patent No.: US 11,216,985 B2
(45) Date of Patent: Jan. 4, 2022

(54) POINT CLOUD ATTRIBUTE COMPRESSION METHOD BASED ON DELETING 0 ELEMENTS IN QUANTISATION MATRIX

(71) Applicant: Peking University Shenzhen Graduate School, Guangdong (CN)

(72) Inventors: Ge Li, Guangdong (CN); Qi Zhang, Guangdong (CN); Yiting Shao, Guangdong (CN); Wen Gao, Guangdong (CN)

(73) Assignee: Peking University Shenzhen Graduate School

( * ) Notice: Subject to any disclaimer, the term of this patent is extended or adjusted under 35 U.S.C. 154(b) by 0 days.

(21) Appl. No.: 17/045,894

(22) PCT Filed: May 15, 2018

(86) PCT No.: PCT/CN2018/086793
§ 371 (c)(1),
(2) Date: Oct. 7, 2020

(87) PCT Pub. No.: WO2019/210531
PCT Pub. Date: Nov. 7, 2019

(65) Prior Publication Data
US 2021/0142522 A1    May 13, 2021

(30) Foreign Application Priority Data

May 3, 2018   (CN) .......................... 201810412818.2

(51) Int. Cl.
G06T 9/00       (2006.01)
G06T 3/40       (2006.01)
G06T 9/40       (2006.01)

(52) U.S. Cl.
CPC ............ *G06T 9/001* (2013.01); *G06T 3/4023* (2013.01); *G06T 3/4084* (2013.01); *G06T 9/40* (2013.01)

(58) Field of Classification Search
None
See application file for complete search history.

(56) References Cited

U.S. PATENT DOCUMENTS 10,158,854 B2 * 12/2018 Svedberg ................ G10L 19/00
10,430,975 B2 * 10/2019 Hemmer ................... G06T 9/40
(Continued)

FOREIGN PATENT DOCUMENTS

CN      106952297       7/2017
CN      107403456       11/2017

OTHER PUBLICATIONS

International Search Report from PCT Application No. PCT/CN2018/086793 dated Feb. 3, 2019, pp. 1-4, including English translation.

*Primary Examiner* — Anand P Bhatnagar
(74) *Attorney, Agent, or Firm* — The Belles Group, P.C.

(57) ABSTRACT

Disclosed in the present invention is a point cloud attribution compression method based on deleting 0 elements in a quantisation matrix, including optimizing a traversal sequence for a quantisation matrix and deleting the 0 elements at the end of the data stream. The present invention may use seven types of traversal sequences at the encoding end of the point cloud attribute compression, such that the distribution of the 0 elements in the data stream may be more concentrated at the end thereof. The 0 elements at the end of the data stream may be deleted, removing redundant information and reducing the quantity of data to be entropy encoded. At the decoding end, the point cloud geometric information may be incorporated to supplement the deleted 0 elements and the quantisation matrix may be restored (Continued)

according to the traversal sequence, thereby improving compression performance without introducing new errors.

7 Claims, 5 Drawing Sheets

(56) References Cited

U.S. PATENT DOCUMENTS

| | | | | |
|---|---|---|---|---|
| 10,552,989 | B2* | 2/2020 | Li | H03M 7/6023 |
| 10,853,973 | B2* | 12/2020 | Tourapis | G06T 9/001 |
| 10,861,196 | B2* | 12/2020 | Mammou | G06T 17/005 |
| 11,010,928 | B2* | 5/2021 | Mammou | G06T 9/001 |
| 2005/0094885 | A1* | 5/2005 | Mitchell | H04N 19/60 |
| | | | | 382/250 |
| 2006/0181536 | A1* | 8/2006 | Ostermann | H04N 13/194 |
| | | | | 345/473 |
| 2017/0214943 | A1 | 7/2017 | Cohen et al. | |
| 2018/0137224 | A1* | 5/2018 | Hemmer | G06T 9/00 |
| 2018/0137653 | A1* | 5/2018 | Hemmer | G06T 9/40 |
| 2021/0118190 | A1* | 4/2021 | Mammou | H04N 19/91 |
| 2021/0150765 | A1* | 5/2021 | Mammou | H04N 19/597 |

* cited by examiner

| header information (a quantisation step size, a prediction pattern, a traversal pattern etc.) | coding block 1 residual code stream | coding block 2 residual code stream | ****** | coding block i residual code stream |
|---|---|---|---|---|

POINT CLOUD ATTRIBUTE COMPRESSION METHOD BASED ON DELETING 0 ELEMENTS IN QUANTISATION MATRIX

CROSS-REFERENCE TO RELATED PATENT APPLICATIONS

The present application is a U.S. national stage application under 35 U.S.C. § 371 of PCT Application No. PCT/CN2018/086793, filed May 15, 2018, which claims priority to Chinese Patent Application No. 2018104128182, filed May 3, 2018. The disclosures of the aforementioned priority applications are incorporated herein by reference in their entireties.

TECHNICAL FIELD OF THE DISCLOSURE

The present disclosure belongs to the point cloud data processing field, relates to a point cloud data compression method, and particularly to a point cloud attribute compression method based on deleting 0 elements in a quantisation matrix.

BACKGROUND

A three-dimensional point cloud is an important manifestation of real-world digitization. With the rapid advancements of three-dimensional scanning devices (lasers, radars, etc.), the accuracy and resolution of a point cloud become higher. The high-precision point clouds are widely applied to the construction of urban digitized map and play a technical support role in numerous hot studies, such as the studies of smart city, unmanned driving, cultural relic protection and the like. The point cloud is obtained by sampling the object surface using a three-dimensional scanning device, and the number of points of one frame of point cloud is generally on the order of million, where each point includes geometric information and attribute information such as a color, a texture and the like, and the amount of data is very large. The large amount of data of the three-dimensional point cloud can be quite challenges for data storage, transmission and the like, so that point cloud compression is very necessary.

The point cloud compression is mainly divided into a geometric compression and an attribute compression, and the frameworks of existing point cloud attribute compression mainly comprise several types of methods as follows:

A. The compression method based on an octree decomposition and a DCT: performing a spatial decomposition on the point cloud by using an octree to obtain a coding block, then performing a depth preferential traversal on the tree, writing the traversed node color value into a two-dimensional JPEG table in a serpentine order, and encoding the obtained point cloud color table by using an existing JPEG encoder, where the JPEG encoder uses a DCT. Although this method uses the existing encoder and the calculation complexity thereof is low, the spatial correlation between two points is not fully utilized, and the compression performance needs to be improved;

B. The compression method based on an octree decomposition and a graph transformation: performing a spatial decomposition on a point cloud by using an octree, then dividing the decomposed spaces into a certain level to obtain a transformed block; forming a graph in each transformed block, connecting two points along any coordinate axis and the distance therebetween not more than 1 by one edge, where the weight of the edge is inversely proportional to its Euclidean distance; and carrying out a graph transformation on the attribute information of the node in the graph. Although the compression performance of this method is good, its operation complexity is higher, and its composition manner may give rise to a sub-graph problem, its efficiency of the graph transformation is affected, so there still remains room for improvement;

C. The compression method based on a KD tree decomposition and a graph transformation: performing a spatial decomposition on the point cloud by using a KD tree, and dividing the decomposed space into a certain depth to obtain a transformed block, where the number of points included in each transformed block is substantially the same; connecting every two points by one edge in the transformed block, where the weight of the edge is related to its Euclidean distance, and the set Euclidean distance threshold of the edge determines the sparsity of the graph; and then carrying out a graph transformation on the attribute information of the point in the graph. The sub-graph problem is thoroughly solved by this method, while the compression performance thereof is greatly improved on aforesaid two methods, but the operation complexity thereof is higher, and its performance needs to be improved.

SUMMARY

In order to further improve the performance of the above technology, under the condition that the calculation complexity is taken into consideration, 7 types of traversal sequences are employed at an encoding end of the point cloud attribute compression according to the present disclosure, which enables that the distribution of 0 elements in the data stream is more concentrated at the end thereof. The 0 elements at the end of the data stream are deleted, thus reducing the quantity of data that needs to be entropy encoded. At a decoding end, point cloud geometric information is incorporated to supplement the deleted 0 elements, thus restoring the quantisation matrix according to the traversal sequence, which enables the improving of compression performance without introducing new errors.

A technical proposal provided by the present disclosure is as follows:

The present disclosure provides a point cloud attribution compression method based on deleting 0 elements in a quantisation matrix; for a quantisation matrix in a point cloud attribute compression process, using an optimal traversal sequence at an encoding end to concentrate 0 elements at the end of a generated data stream and implementing an entropy encoding after deleting the 0 elements, reducing the data quantity of the data stream and reducing the code streams generated after encoding; at a decoding end, incorporating point cloud geometric information to restore the deleted 0 elements, ensuring that the present method does not introduce additional error; comprising the following steps:

1) Point Cloud Attribute Compression Encoding Process

Implementing a KD tree division on the point cloud data to be compressed based on the geometric information, where the blocks generated at the final layer of the KD tree division are point cloud coding blocks, generating a quantisation matrix by implementing an intra-frame prediction, a residual transformation, and a quantisation on the attribute information in each coding block.

2) Optimising the Traversal Sequence for a Quantisation Matrix at the Encoding End:

Applying 7 types of different traversal sequences to each quantisation matrix, transforming the two-dimensional matrix into a one-dimensional data stream, comparing the numbers of 0 elements appeared in succession at the end of the data streams, selecting the data stream in which the number of 0 elements appeared in succession at the end thereof is most as an optimal data stream, while recording the corresponding traversal pattern.

3) Deleting the 0 Elements at the End of the Data Stream:

Deleting all 0 elements appeared in succession at the end thereof after resulting in an optimal data stream, thus obtaining a clipped data stream, after implementing the same operations on all coding blocks, performing an entropy coding in a unified manner, thus resulting in a point cloud attribute compressed code stream.

4) Referring to the Geometric Information to Restore the Quantisation Matrix at a Decoding End:

Carrying out an entropy decoding on a code stream to obtain the clipped data stream at a decoding end, incorporating the point cloud geometric information to solve for the number of deleted 0 elements and implementing a supplement, thus resulting in an original data stream, restoring a two-dimensional quantisation matrix from the one-dimensional data stream according to the traversal sequence.

5) Point Cloud Attribute Compression Decoding Process:

Performing an inverse quantisation, an inverse transformation, and a prediction compensation on the restored quantisation matrix sequentially, thus obtaining the decoding result that is point cloud attribute information.

At aforesaid step 1), a point KD tree division method is a binary division method; supposing that there is a total of N points in the point cloud to be processed, and the KD tree division depth is set to d, obtaining $2^d$ coding blocks after dividing the point cloud d times, where the number of points in each block is close, and is n or n+1, the calculation method of n shown as in formula 1; and numbering all coding blocks according to a breadth preferential traversal sequence, where the coding block number will be the order of post-processing of the coding blocks.

$$n = \left\lfloor \frac{N}{2^d} \right\rfloor \qquad \text{(formula 1)}$$

The size of the quantisation matrix obtained at aforesaid step 1) is related to the number of the points in the coding block, i.e. n×3 or (n+1)×3.

At aforesaid step 2), 7 types of traversal sequences are applied to each quantisation matrix, where 7 types of traversal sequences are a YUV progressive scan, a YUV column by column scan, a YVU column by column scan, a UYV column by column scan, a UVY column by column scan, a VYU column by column scan, and a VUY column by column scan, respectively. After scanning, the n×3 two-dimensional matrix is transformed to an one-dimensional data stream having a length of 3n; and the data stream in which the number of 0 elements appeared in succession at the end thereof is most is selected as an optimal data stream, while recording the corresponding traversal pattern.

The length of the optimal data stream selected at aforesaid step 3) is 3n, supposing that the number of 0 elements appeared in succession at the end of the data stream is $l_t$, the length of the clipped data stream is $3n-l_t$.

The clipped data streams having the length of $l_c$ is obtained after performing an entropy decoding at aforesaid step 4), and the number of deleted 0 elements needs to be known to restore the original data stream. The same KD tree division is implemented on the point cloud geometric information at a decoding end as at the encoding end to obtain $2^d$ coding block, including n (or n+1) points in each block; then numbering all coding blocks according to breadth preferential traversal sequence, obtaining a result in one-to-one correspondence with the encoding end, and solving for the number of deleted 0 elements $l_0$ according to formula 2. The length of the data stream after the 0 elements are supplemented is 3n, and transforming the data stream to a n×3 quantisation matrix according to the saved traversal pattern $m_i$.

$$l_0 = 3n - l_c \qquad \text{(formula 2)}$$

Details at aforesaid step 5) are as follows:

(5-1) After obtaining a quantisation matrix at step 4), performing an inverse quantisation, an inverse transformation, and a prediction compensation on the quantisation matrix, thus obtaining the decoding result that is point cloud attribute information;

(5-2) The code stream according to the point cloud attribute compression method based on deleting 0 elements in a quantisation matrix is mainly composed of two parts: compressed header information and coding block information. The header information mainly comprise a quantisation step size, prediction pattern information, traversal pattern information of a quantisation matrix and the like; and the coding block information in a coding block unit is arranged in accordance with the sequence of the coding blocks, where mainly comprised within each coding block is the color residual information of the coding block;

(5-3) The performance of the point cloud attribute compression is measured by a code rate and a PSNR (Peak Signal-to-Noise Ratio), where the unit of code rate is bpp (bits per point), the unit of PSNR is decibels (dB), and the smaller the code rate, the greater the PSNR, and the better the point cloud attribute compression performance.

In comparison with prior arts, the advantageous effects of the present disclosure are as follows:

The present disclosure provides a point cloud attribution compression method based on deleting 0 elements in a quantisation matrix, which gives the following technical advantages:

(A) For a quantisation matrix in a point cloud attribute compression process, at an encoding end, an optimal traversal sequence is used to concentrate the 0 elements at the end of a generated data stream and implement an entropy encoding after deleting the 0 elements, thus reducing the data quantity of the data stream and reducing the code streams generated after encoding.

(B) At a decoding end, the point cloud geometric information is incorporated to supplement the deleted 0 elements, restoring the quantisation matrix according to the traversal sequence, which enables the improving of compression performance without introducing new errors.

DETAILED DESCRIPTION

Hereinafter, the present disclosure is further described, by way of embodiment, in conjunction with the appended drawings, which are not intended to limit the scope of the invention in any way.

The present disclosure provides a point cloud attribute compression method based on deleting 0 elements in a quantisation matrix, for a quantisation matrix in a point cloud attribute compression process, using an optimal traversal sequence at an encoding end to concentrate the 0 elements at the end of a generated data stream and implementing an entropy encoding after deleting the 0 elements, reducing the data quantity of the data stream and reducing the code streams generated after encoding; at a decoding end, incorporating point cloud geometric information to restore the deleted 0 elements, ensuring that present method does not introduce additional error.

Figure 1A:
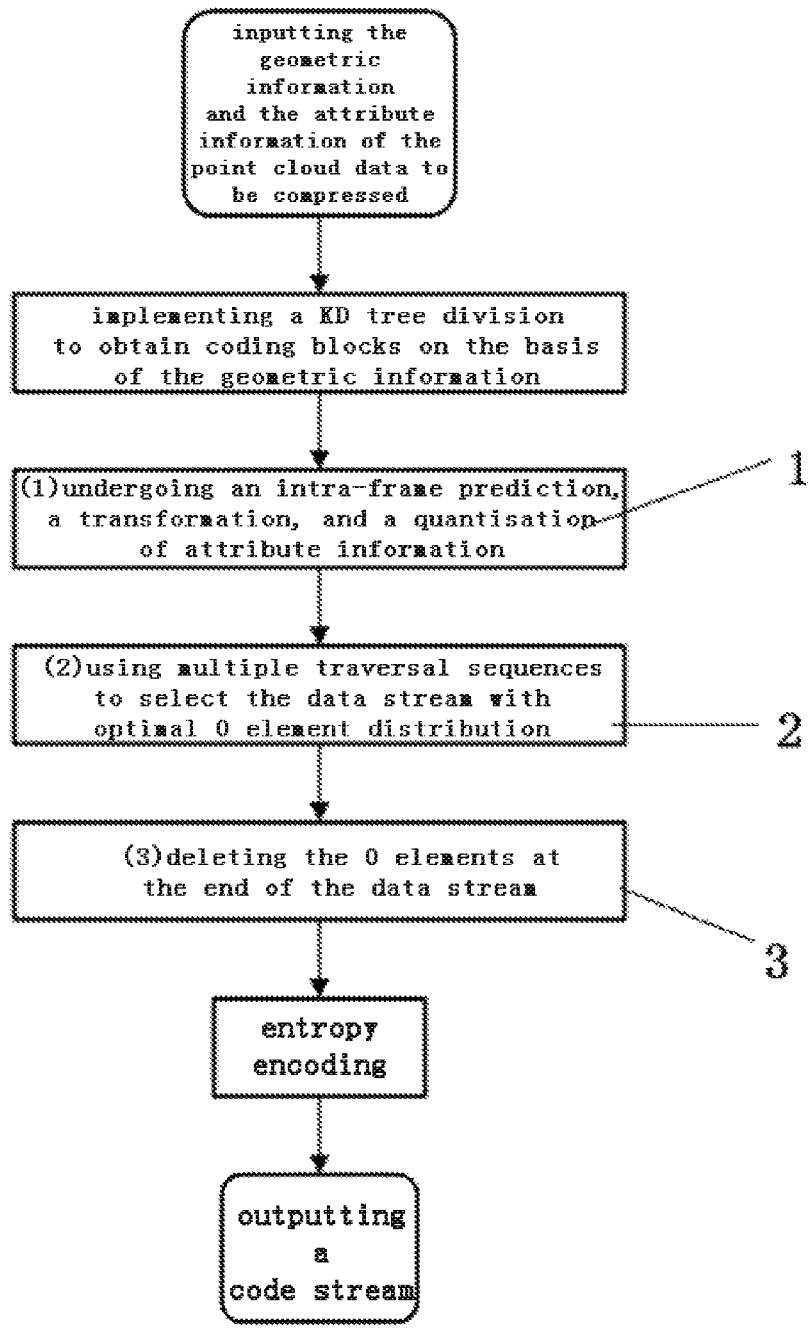
FIG. 1a is a block flow diagram at an encoding end of the method according to the present disclosure.

FIG. 1a is a block flow diagram at an encoding end of the method according to the present disclosure; at first step, inputting the geometric information and attribute information of the point cloud data to be compressed at a encoding end; at second step, implementing a KD tree division based on the point cloud geometric information to obtain coding blocks in which the number of points is close, and sequentially numbering the coding blocks; at third step 1, corresponding to the step (1) described in the summary provided herein that performs an intra-frame prediction, a transformation, and a quantisation on attribute information, performing an intra-frame prediction, a transformation, and a quantisation on the attribute information in each coding block to obtain a corresponding quantisation matrix; at fourth step 2, corresponding to the step (2) described in the summary provided herein that uses a plurality of types of traversal sequences to select the data stream with optimal 0 element distribution, using a plurality of types of traversal sequences to transform the quantisation matrix into a data stream, selecting the optimal data stream in which the distribution of the 0 elements is most concentrated at the end thereof; at fifth step 3, corresponding to the step (3) described in the summary provided herein that deletes the 0 elements at the end of the data stream, deleting the 0 elements at the end of the data stream obtained in the previous step; at step 6, performing an entropy coding on the data stream of all coding blocks in a unified manner; finally, obtaining the code stream of the point cloud attribute information.

Figure 1B:
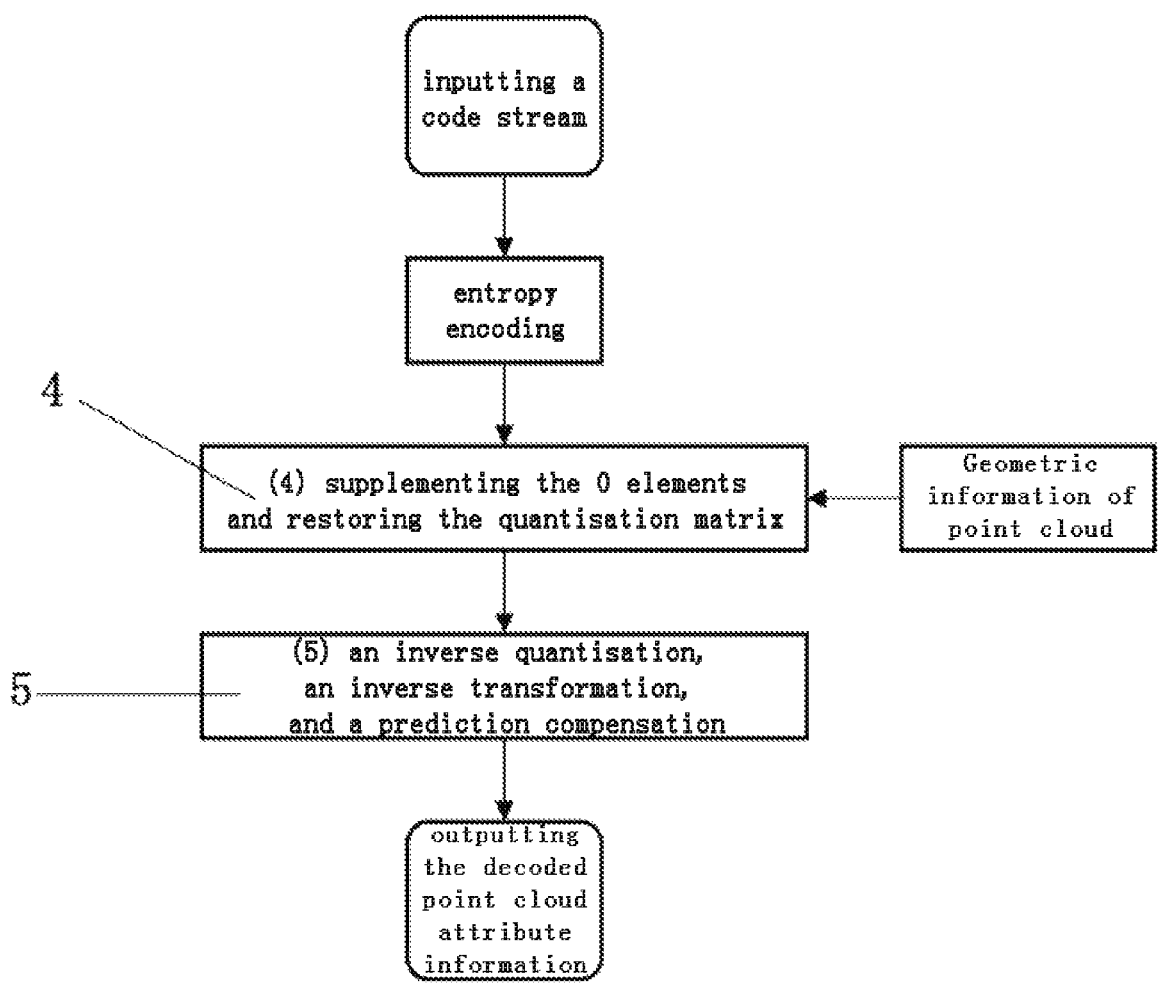
FIG. 1b is a block flow diagram at a decoding end of the method according to the present disclosure.

FIG. 1b is a block flow diagram at a decoding end of the method according to the present disclosure, at first step, inputting the code stream requiring point cloud attribute information to be processed at a decoding end; at second step, implementing an entropy encoding on the code stream to obtain a data stream of all coding blocks; at third step 4, corresponding to the step (4) described in the summary provided herein that supplements the 0 elements and restores the quantisation matrix, referring to the geometric information, supplementing the 0 elements at the end of the data stream according to the sequence of the coding blocks and restoring a quantisation matrix from the data stream; at fourth step 5, corresponding to the step (5) described in the summary provided herein that performs an inverse quantisation, an inverse transformation, and a prediction compensation, performing an inverse quantisation, an inverse transformation, and a prediction compensation on the quantized mean to obtain the attribute information corresponding to each block; and finally, outputting the decoded point cloud attribute information.

Figures 2, 3:
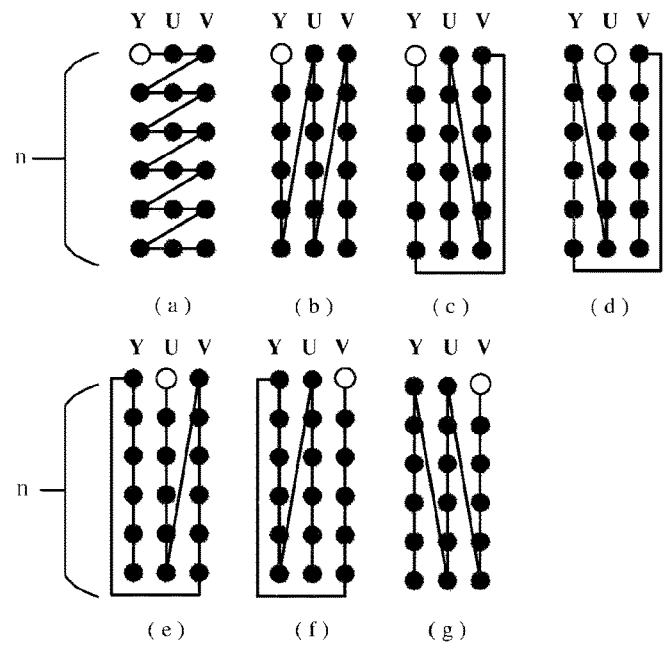
FIG. 2 is an exemplary diagram of 7 types of traversal sequences applied at an encoding end to a quantisation matrix.
FIG. 3 is an exemplary diagram of a code stream structure after point cloud attribute information compression.

FIG. 2 is an exemplary diagram of 7 types of traversal sequences applied to a quantisation matrix at an encoding end, (a) to (g) respectively representing a process for implementing a YUV progressive scan, a YUV column by column scan, a YVU column by column scan, a UYV column by column scan, a UVY column by column scan, a VYU column by column scan, and a VUY column by column scan on a n×3 quantisation matrix, each point corresponding to each element in the quantisation matrix, where the white point is the starting point of the traversal.

FIG. 3 is an exemplary diagram of a code stream structure after a point cloud attribute information compression is performed. A code stream is mainly composed of header information and coding block information of each coding block. The header information mainly comprises the information such as a quantisation step size, a prediction pattern, a traversal pattern of a quantisation matrix and the like; the coding block information in a coding block unit is arranged in accordance with the traversal sequence of the coding blocks, where presented within each coding block information is the color residual of the coding block.

Figure 4A:
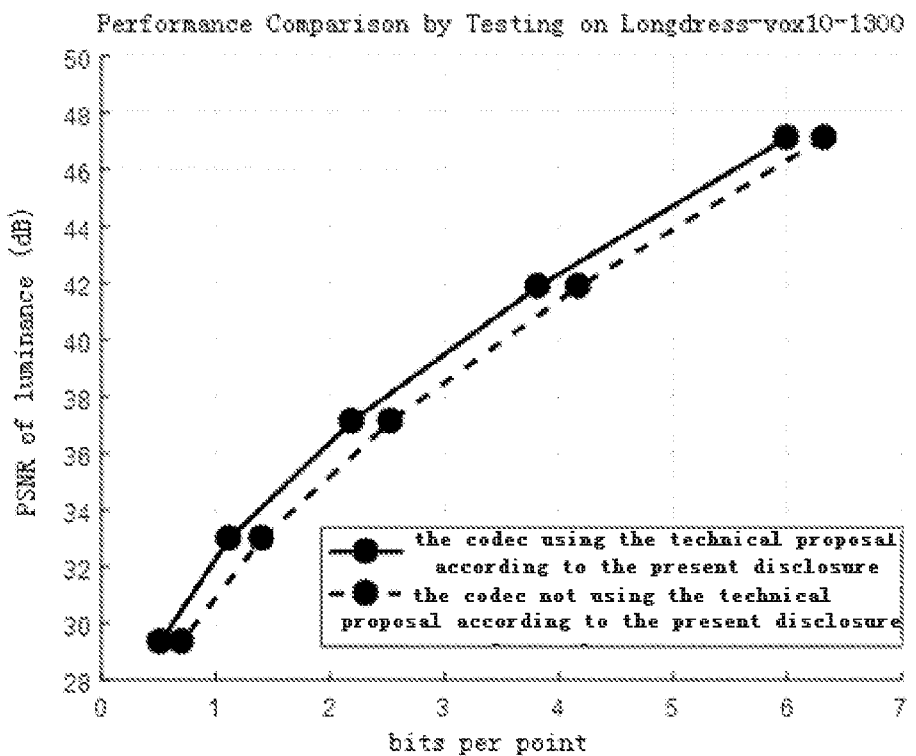
FIG. 4a is a contrast graph for comparing the compression performance of the method according to the present disclosure with the existing traditional method by testing on Longdress-vox10-1300.ply.
Figure 4B:
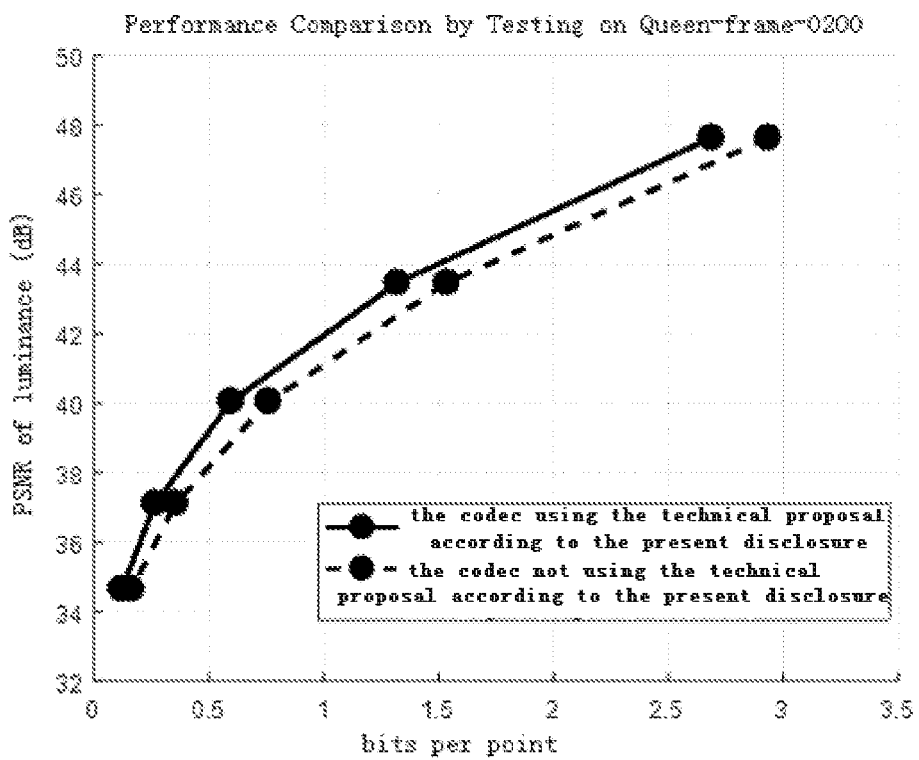
FIG. 4b is a contrast graph for comparing the compression performance of the method according to the present disclosure with the existing traditional method by testing on Queen-frame-0200.ply.
Figure 4C:
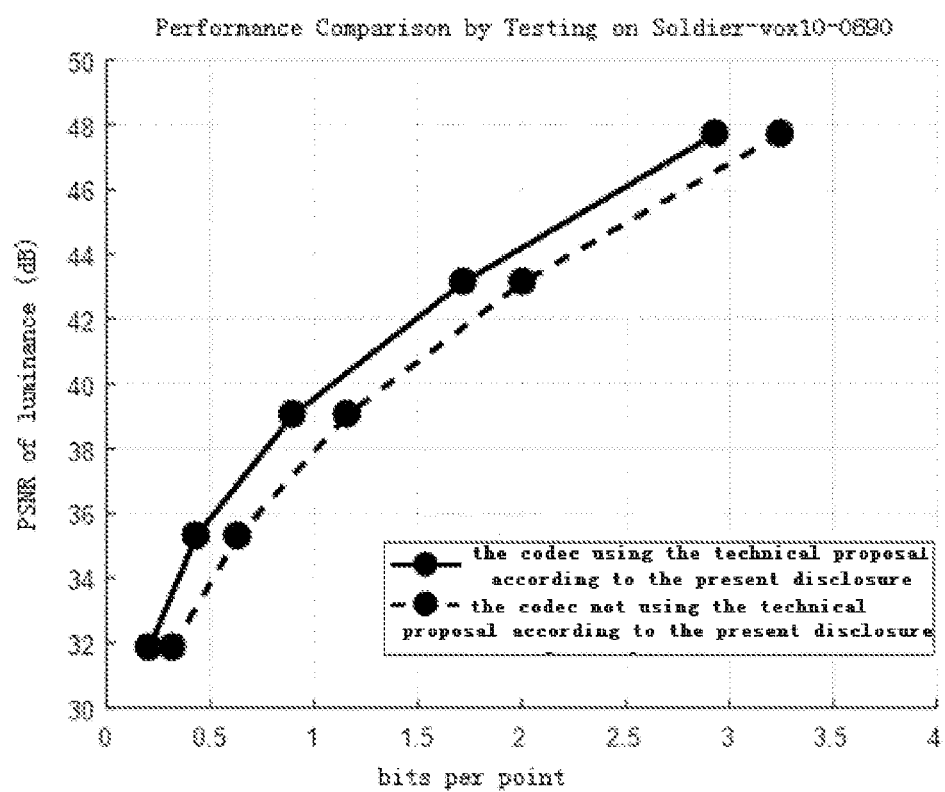
FIG. 4c is a contrast graph for comparing the compression performance of the method according to the present disclosure with the existing traditional method by testing on Soldier-vox10-0690.ply.

FIGS. 4a, 4b, and 4c are contrast graphs for comparing the compression performance of the method according to the present disclosure with the existing traditional method by testing on Longdress-vox10-1300.ply, Queen-frame-0200.ply, and Soldier-vox10-0690.ply. The horizontal axis represents the code rates in units of bpp (bits per point), and the vertical axis represents the PSNRs (Peak Signal-to-Noise Ratio) of luminance Y in units of decibel (dB), where the smaller the code rate, the greater the Peak Signal-to-Noise Ratio, and the better the point cloud attribute compression performance.

A point cloud attribute compression is carried out for the official point cloud data sets: a Longdress-Vox 10-1300 Ply, a Queen-Vox_Frame_0200 Ply, and a Soldier-Vox 10-0690 Ply in the MPEG point cloud compression working group by using the method according to the present disclosure, and as shown in FIG. 1, taking Longdress-Vox 10-1300 Ply as an example, the specific implementation steps are as follows:

(1) Point Cloud Attribute Compression Encoding Process:

A point cloud Longdress-vox10-1300.ply has a total of 857,966 points. Suppose the KD tree division depth is set to 13, there is a total of 8,192 coding blocks after being divided, the number of points in a block is 104 or 105, for example, 104 points as to the first coding block, and the attribute information in a block undergoes an intra-frame prediction, a residual transformation, and a quantisation (the quantisation step size is 4) to result in a 104×3 quantisation matrix $Q_1$.

(2) Optimising the Traversal Sequence for a Quantisation Matrix at an Encoding End:

7 types of different traversal sequences are applied to the resulting quantisation matrix $Q_1$. After comparation, it was found that the number of 0 elements in the data stream resulting from the YUV column-by-column scan appeared in succession at the end thereof is most, therefor selecting this pattern to transform the two-dimensional quantisation matrix into a one-dimensional data stream $S_1$ having a length of 312, while recording the traversal pattern $M_1=1$ corresponding to the first block.

(3) Deleting the 0 Elements at the End of the Data Stream

For the resulting data stream $S_1$, 266 0 elements appeared in succession at the end thereof are deleted, thus resulting in a new data stream having a length of 46. After all 8,192 coding blocks undergo the same operations, the respective coding block information is respectively written into the data streams, then the information of a quantisation step size, a traversal pattern, and a prediction pattern and the like is written into the compression header information, performing an entropy coding in a unified manner, the structure of the outputted final code stream files is shown as in FIG. 3.

(4) Referring to the Geometric Information to Restore the Quantisation Matrix at a Decoding End:

At a decoding end, a code stream file is inputted to carry out an entropy decoding, thus resulting in header information and the coding block information of 8,192 blocks, and taking the first block as an example, resulting in a clipped data stream having a length of 46. The number of deleted 0 elements needs to be known in order to restore the original data stream. At a decoding end, the same KD tree division is implemented on the point cloud geometric information as at an encoding end to obtain 8,192 coding block, having 104 points in the first block, thus the number of deleted 0 elements solved for is 266. The length of the data stream after the 0 elements are supplemented is 312. According to the traversal pattern $M_1=1$ of the first block in the header information, the data stream is transformed to a 104×3 quantisation matrix by using the traversal sequence of the YUV column-by-column scan.

(5) Point Cloud Attribute Compression Decoding Process:

Information of a quantisation step size, a prediction pattern and the like is incorporated into the restored quantisation matrix. An inverse quantisation, an inverse transformation, and a prediction compensation are sequentially performed to solve for the attribute information of the point cloud. The performance of the point cloud attribute compression is measured by a code rate and a Peak Signal-to-Noise Ratio (PSNR), where the unit of code rate is bpp (bits per poin), and the unit of PSNR is decibels (dB).

In order to verify the effect of the point cloud attribute compression method based on deleting 0 elements in a quantisation matrix according to present disclosure, aforesaid three data sets: a Longdress-vox10-1300.ply, a Queen-frame-0200.ply, and a Soldier-vox10-0690.ply are used for carrying out experiments, and in terms of compression performance, the comparison results to existing methods are shown as in FIG. 4.

As can be seen from FIG. 4, in the case of employing the same point cloud attribute compression encoder based on an intra-frame prediction, a graph transform, a quantisation, and an entropy encoding, a stable and significant performance gain is produced as to three types of typical point cloud data on which a test is performed, after the method based on deleting 0 elements in a quantisation matrix according to the present disclosure is introduced. In the present method, at the encoding end of a point cloud attribute compression, the optimal traversal sequence is applied to a quantisation matrix to concentrate the 0 elements at the end of a data stream and deletes them, thus removing redundant information; at a decoding end, the point cloud geometric information is incorporated to supplement the deleted 0 elements, restoring the quantisation matrix according to the traversal sequence, and ensuring that none of the new errors are introduced. Experimental results show that at each code rate, the performance of a point cloud attribute compression according to present disclosure is improved, the generated gain according to the present disclosure is stable, and the advantage thereof is outstanding.

It should be noted that the purpose for disclosing the embodiments is to facilitate further understanding the present disclosure, but those skilled in the art will appreciate that various substitutions and modifications are possible, without departing from the scope and spirit of the present disclosure disclosed in the specification and the accompanying claims. Accordingly, the scope of the invention is not limited by the disclosure of the embodiment, but the claimed scope of the present disclosure is defined by the accompanying claims.

INDUSTRIAL APPLICABILITY

The present disclosure provides a point cloud attribute compression method based on deleting 0 elements in a quantisation matrix, for a quantisation matrix in a point cloud attribute compression process, using an optimal traversal sequence at an encoding end to concentrate the 0 elements at the end of a generated data stream and implementing an entropy encoding after deleting the 0 elements, reducing the data quantity of the data stream and reducing the code streams generated after encoding; at a decoding end, incorporating point cloud geometric information to restore the deleted 0 elements, ensuring that the present method does not introduce additional error. With the rapid advancements of three-dimensional scanning devices (lasers, radars, etc.), the accuracy and resolution of a point cloud become higher. The high-precision point clouds are widely applied to the construction of urban digitized map and play a technical support role in numerous hot studies, such as the studies of the smart city, unmanned driving, cultural relic protection and the like.

What is claimed is:

1. A point cloud attribute compression method based on deleting 0 elements in a quantisation matrix, for a quantisation matrix in a point cloud attribute compression process, using an optimal traversal sequence at an encoding end to concentrate the 0 elements at the end of a generated data stream and implementing an entropy encoding after deleting the 0 elements, comprising the following steps:

1) Point Cloud Attribute Compression Encoding Process
Implementing a KD tree division on the point cloud data to be compressed based on geometric information, where the blocks generated at the final layer of the KD tree division are point cloud coding blocks, generating a quantisation matrix by implementing an intra-frame prediction, a residual transformation, and a quantisation on the attribute information in each coding block;

2) Optimising the Traversal Sequence for a Quantisation Matrix at an Encoding End:
Applying 7 types of different traversal sequences to each quantisation matrix, transforming the two-dimensional matrix into a one-dimensional data stream, comparing the numbers of 0 elements appeared in succession at the end of the data streams, selecting the data stream in which the number of 0 elements appeared in succession at the end thereof is most as an optimal data stream, while recording the corresponding traversal pattern;

3) Deleting the 0 Elements at the End of the Data Stream:
Deleting all 0 elements appeared in succession at the end thereof after resulting in an optimal data stream, thus obtaining a clipped data stream, after implementing the same operations on all coding blocks, performing an entropy coding in a unified manner, thus resulting in a point cloud attribute compressed code stream;

4) Referring to the Geometric Information to Restore the Quantisation Matrix at a Decoding End:

Carrying out an entropy decoding on a code stream to obtain the clipped data stream at a decoding end, incorporating the point cloud geometric information to solve for the number of deleted 0 elements and implementing a supplement, thus resulting in an original data stream, restoring a two-dimensional quantisation matrix from the one-dimensional data stream according to the traversal sequence;

5) Point Cloud Attribute Compression Decoding Process:

Performing an inverse quantisation, an inverse transformation and a prediction compensation on the restored quantisation matrix sequentially, thus obtaining the decoding result that is cloud attribute information.

2. The point cloud attribute compression method of claim 1, wherein, at step 1), a point KD tree division method is a binary division method, supposing that there is a total of N points in the point cloud to be processed, and the KD tree division depth is set to d, obtaining $2^d$ coding blocks after dividing the point cloud d times, where the number of points in each block is close, and is n or n+1, the calculation method of n shown as in formula 1; and numbering all coding blocks according to a breadth preferential traversal sequence $b_1, b_2, \ldots, b_i, \ldots, b_{2^d}$, where the coding block number will be the order of post-processing of the coding blocks, $$n = \left\lfloor \frac{N}{2^d} \right\rfloor. \quad \text{(formula 1)}$$

3. The point cloud attribute compression method of claim 1, wherein, the size of the quantisation matrix obtained at step 1) is related to the number of the points in the coding block, i.e. n×3 or (n+1)×3.

4. The point cloud attribute compression method of claim 1, wherein, at step 2), applying 7 types of traversal sequences to each quantisation matrix, where 7 types of traversal sequences are a YUV progressive scan, a YUV column by column scan, a YVU column by column scan, a UYV column by column scan, a UVY column by column scan, a VYU column by column scan, a VUY column by column scan, respectively; after scanning, transforming the n×3 two-dimensional matrix to an one-dimensional data stream having a length of 3n; and selecting the data stream in which the number of 0 elements appeared in succession at the end thereof is most as an optimal data stream, while recording the corresponding traversal pattern $m_i$.

5. The point cloud attribute compression method of claim 1, wherein, the length of the optimal data stream selected at step 3) is 3n, supposing that the number of 0 elements appeared in succession at the end of the data stream is $l_i$, the length of the clipped data stream is $3n-l_i$.

6. The point cloud attribute compression method of claim 1, wherein, performing an entropy decoding at step 4) to obtain the clipped data streams having the length of $l_c$; as the number of deleted 0 elements needs to be known in order to restore the original data stream, implementing the same KD tree division on the point cloud geometric information at a decoding end as at the encoding end to obtain $2^d$ coding block, including n or n+1 points in each block, numbering all coding blocks according to a breadth preferential traversal sequence, obtaining a result in one-to-one correspondence with the encoding end, solving for the number of deleted 0 elements $l_0$ according to formula 2; where the length of the data stream after the 0 elements are supplemented is 3n, and transforming the data stream to a n×3 quantisation matrix according to the saved traversal pattern $m_i$.

$$l_0 = 3n - l_c \quad \text{(formula 2)}$$

7. The point cloud attribute compression method of claim 1, wherein, details at step 5) are as follows:
   (7-1) After obtaining a quantisation matrix at step 4), performing an inverse quantisation, an inverse transformation, and a prediction compensation on the quantisation matrix sequentially, thus resulting in cloud attribute information;
   (7-2) The code stream according to the point cloud attribute compression method based on deleting 0 elements in a quantisation matrix is mainly composed of two parts: header information and coding block information, where the header information mainly comprise a quantisation step size, prediction pattern information, traversal pattern information of a quantisation matrix and the like, and the coding block information in a coding block unit is arranged in accordance with the traversal sequence of the coding blocks, where mainly comprised within each coding block is the color residual of the coding block;
   (7-3) The performance of the point cloud attribute compression is measured by a code rate and a Peak Signal-to-Noise Ratio (PSNR), where the unit of code rate is bpp (bits per poin), the unit of PSNR is decibels (dB), and the smaller the code rate, the greater the PSNR, and the better the point cloud attribute compression performance.

* * * * *